Oct. 25, 1966  D. E. ERICSON ET AL  3,280,880
METHOD OF AND APPARATUS FOR
INFLATING TUBELESS TIRES
Filed Jan. 29, 1965
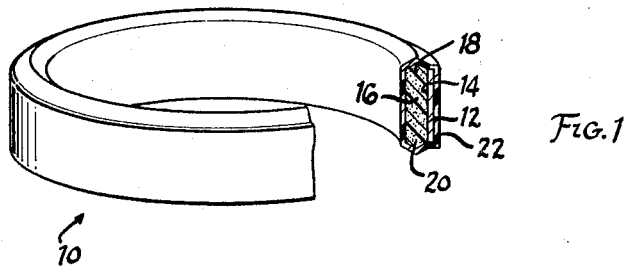
FIG. 1
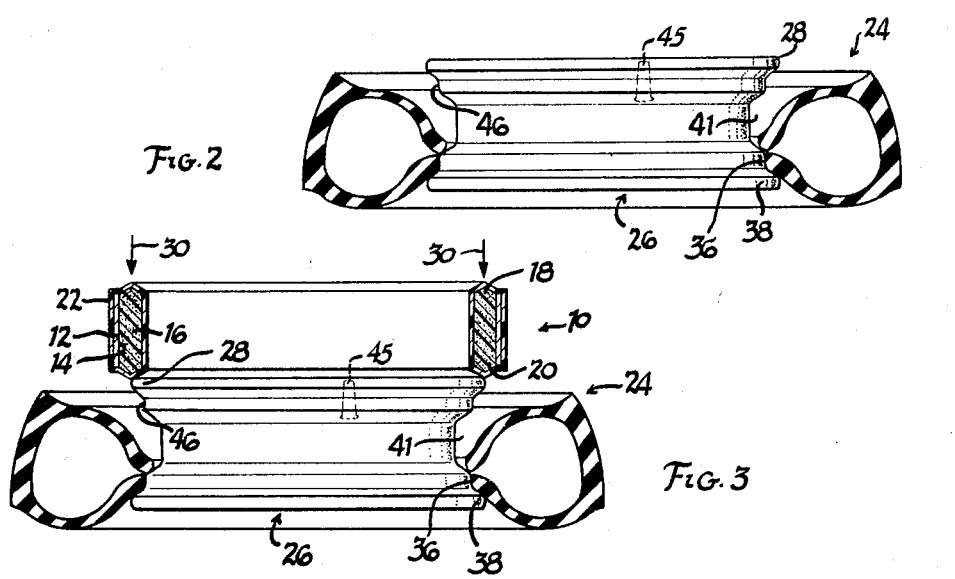
FIG. 2
FIG. 3
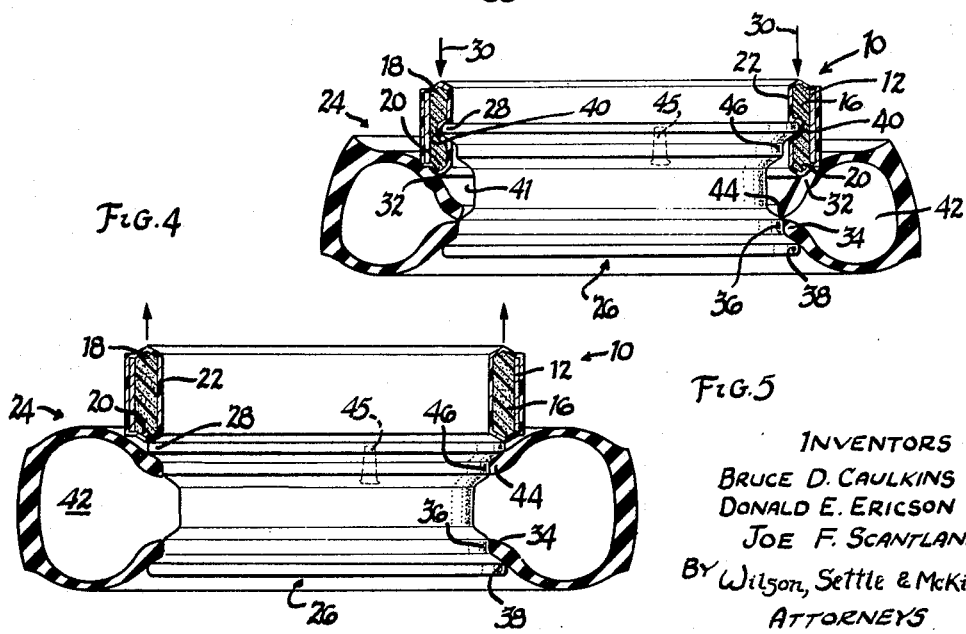
FIG. 4
FIG. 5
INVENTORS
BRUCE D. CAULKINS
DONALD E. ERICSON
JOE F. SCANTLAND
BY Wilson, Settle & McKinnon
ATTORNEYS

United States Patent Office 3,280,880
Patented Oct. 25, 1966

3,280,880
METHOD OF AND APPARATUS FOR INFLATING TUBELESS TIRES
Donald E. Ericson, 29953 Pipers Lane, Farmington, Mich.; Bruce D. Caulkins, 15 N. Edgewood Drive, Grosse Pointe Shores, Mich.; and Joe F. Scantland, 18301 Ash St., East Detroit, Mich.
Filed Jan. 29, 1965, Ser. No. 429,032
3 Claims. (Cl. 157—1.1)

The present invention relates generally to a system for mounting a tubeless tire on a vehicle wheel rim and more particularly to a simplified, completely safe tubeless tire mounting system, including method and apparatus, which easily accommodates inflation of the tire by providing a temporary airtight seal preferably between one tire sidewall and the rim, using a sealing device. The sealing device accommodates spreading of the sidewalls of the tire to seal the tire beads against the rim during inflation of the tire without subjecting the sealing device to inflation-induced loads of potentially dangerous magnitudes.

In the past, it has been general commercial practice to mount and inflate pneumatic tubeless tires of the automotive type upon wheel rims having a pair of flanges by use of a hoop-shaped "bead expander" or "tire squeezing band." This type of tool exerts a circumferential peripheral compressive force about the crown or tread of the tire to spread the tire beads into sealed relation with the rim (for example, see United States Patents 1,966,580 and 2,818,913).

Procedurally, when such a tubeless tire is first placed between the flanges of the wheel rim, the tire will generally lift loosely on the rim and, in that association, it is virtually impossible to inflate the tire. Therefore, in order to effectuate an initial seal between the tire and the rim, the bead expander tool must be accurately positioned around the crown of the tire and foreshortened to radially compress the crown of the tire. This compression spreads or bulges the tire sidewalls and displaces the tire beads into air-sealed relation with the bead grooves at the rim flanges. The tire is then partially inflated to insure retention of the seals between the beads and the bead grooves, the pressure being exerted on the bead expander tool being of a high order of magnitude, for example, forces greater than 1600 pounds may be exerted on the tool. Thereafter, the bead expander tool is released and removed from the crown of the tire whereupon inflation of the tire is resumed and the tire-wheel rim assembly, when fully inflated, is ready for installation use upon an automotive vehicle. This type of method and apparatus for mounting and inflating tubeless tires has several limiting deficiencies.

First and foremost, this practice is very dangerous to the person or persons mounting and inflating the tire. Such persons are fully exposed to potential and actual bead expander tool breakage at a point in time when the bead expander tool is being subjected to the very high air inflation-induced forces previously described, which forces are necessary to create the seals between the tire beads and the flange bead grooves. Additional disadvantages of the above-described tire mounting system include: (1) Relatively high labor costs are required to utilize tools of the bead expander type since (a) they require accurate positioning on the tread or crown of the tire in order to make the tire initially airtight against the rim and (b) the efforts of two men are frequently required to properly manipulate such devices; (2) These devices are constructed of multiple relatively moveable components which make the bead expander tool very complex and costly to initially purchase and to maintain, especially since the tool is continually subjected to the high radial inflation pressures required to seat the beads on the rim; and (3) These devices are not only difficult to handle and manipulate but are also time consuming to operate since procedurally use thereof necessitates the separate steps of (1) partial inflation of the tire, (2) removal of the bead expander tool, and (3) full inflation of the tire.

With the foregoing in mind, it would be a valuable contribution to the tubeless tire mounting and inflating art to provide a system for accommodating inflation of tubeless tires which is completely safe to personnel, structurally simple and economical to manufacture and maintain, easily handled and manipulated in a very short time by one man and allows the tire to be continuously inflated to operating pressure without cessation to remove the apparatus.

The present invention provides such a tire mounting and inflating system. The system of the present invention includes a novel method and apparatus which, in the preferred embodiment, includes an annular sealing ring which is manipulatively displaced, manually or mechanically, laterally across one flange of the rim after the tire has been loosely positioned between the rim flanges. In this manner, one edge of the sealing ring is compressed against one sidewall of the tire in airtight sealed relation and the inside periphery of the sealing ring is compressed in airtight sealed relation against the flange over which it has been displaced. At the same time, the amount of displacement of the sealing ring must be sufficient to initially engage and seal the other bead with the opposite flange at the bead groove. Thereafter, the tire is inflated, which inflation spreads the tire sidewalls and concurrently displaces the sealing ring back across the rim flange in such a way as to avoid breaking the seals between the sealing ring and the sidewall, and the sealing ring and the flange over which the sealing ring is displaced until such time as both beads are seated in sealed engagement with the ring.

In the preferred embodiment, the sealing ring of this invention comprises a laminated annular ring having a rigidifying metal band, covered on the inside by an integral, relatively thick compressible layer of foamed plastic projecting beyond the side edges of the metal band, all of which is covered by a wear resistant skin such as vinyl plastic.

Accordingly, it is a primary object of this invention to provide a novel system, including method and apparatus, for mounting and inflating a tubeless tire on a wheel rim, which system eliminates potential and actual danger to personnel using or near the system.

Another important object of this invention is the provision of a novel system for mounting and inflating a tubeless tire on the rim having one or more of the following features:
 (1) Structurally simple and durable;
 (2) Economical to purchase and maintain;
 (3) Having no or at least few working parts;
 (4) Foolproof and simple to handle and operate by one person, and
 (5) Requiring only a short time to completely mount and fully inflate the tire.

Other objects and features of this invention will become apparent from the following description and appended claims, in conjunction with the accompanying drawings, wherein:

FIGURE 1 is a perspective view of a presently preferred sealing ring embodiment of the present invention;

FIGURES 2 through 5 diagrammatically illustrate, in elevation shown partly in cross section, the manipulative steps of utilizing the sealing ring of the FIGURE 1 to mount a tubeless tire on a wheel rim.

Referring now to the drawings wherein like numerals are used to designate like parts throughout, FIGURE 1 illustrates a presently preferred sealing ring embodiment of this invention. The sealing ring 10 of FIGURE 1 structurally comprises a band 12 of solid or expanded metal which functions to rigidify and to maintain the sealing ring 10 in annular configuration.

Integral with the internal surface 14 of the metal band 12 is a compressible layer 16, preferably of foamed plastic material. The foamed plastic material of the compressible layer 16 may be bonded or otherwise secured to the surface 14 and may be either pre-formed or formed in place adjacent the surface 14. Significantly, the compressible layer 16 is configured so that it provides a pair of projecting tips 18 and 20, one of which will engage against the sidewall of the tire during mounting and inflation thereof in a manner and for purposes subsequently to be described. The radial thickness of the compressible layer 16 is preferably on the order of one to two inches so that variations in the rim flange diameter for any given sized wheel (which variations may be as much as ⅜") may be accommodated, regardless of the automotive make of the vehicle upon which the wheel and tire assembly will ultimately be attached.

A plastic skin or wear-resistant surface 22 envelops the external periphery of both the metal band 12 and the compressible layer 16. The plastic skin 22 is preferably vinyl although other equivalent or similar plastic coatings and the like may be used. The skin 22 may be coated on the band 12 and the layer 16 in any desired fashion, for example, by dipping one or more times. The plastic skin 22, which preferably envelops the external periphery of the metal band 12 functions to guard against rust, corrosion and surface abrasion. If desired, the external periphery of band 12 may be exposed, with the plastic skin 22 covering only the compressible layer 16. The portion of the plastic skin 22 enveloping the compressible layer 16 in either case acts as a wearing and abrasion-resistant surface to thereby prolong the life of the compressible layer 16, which is repeatedly subjected to frictional forces as will subsequently become apparent as the description proceeds. Of course, while the normal life span of the sealing ring 10 is extremely long, nevertheless serious abuse may result in an occasional rupture in the plastic skin 22. If and when such ruptures occur, they may be easily patched by use of known techniques constituting part of the prior art.

In contrast to prior art devices used to mount and inflate tubeless tires, the sealing ring 10 of the embodiment of FIGURE 1 has no moving parts. Consequently, wear, maintenance and costs incurred thereby are greatly reduced and the total useful life of the device is, consequently, significantly increased.

It is contemplated that when the sealing ring 10 is used in conjuction with the mounting and inflation of automobile tires upon automobile wheel rims that a set of three such sealing rings will be provided for automotive servicing establishments such as service stations. These three sealing rings will be respectively sized to accommdoate mounting of tubeless tires upon the standard 13", 14" and 15" automobile wheel rims. Of course, the sealing ring 10 may be sized so as to be usable with any type of tubeless tire including truck tires and the like as well as with off the road equipment tubeless tires including airplane tires.

It is to be appreciated while the rigidifying band 12 has been described as being composed of metal that a rigid plastic, such as Teflon or the like, may also be used to formulate a similar band to serve the same rigidifying and configurating function served by the metal band 12, as may other equivalents.

Reference is now made to the schematic representation of FIGURES 2 through 5 which in sequence diagrammatically depicts the manipulative procedure whereby the sealing ring 10 of FIGURE 1 is used to facilitate mounting and inflation of a pneumatic tubeless tire 24 upon a wheel rim 26.

Initially the tubeless tire 24 is placed by means of conventional procedures between the flanges 28 and 38 of the wheel rim 26 in loose fit relation, as depicted in FIGURE 2. In order to make the interior 42 of the tire 24 airtight to accommodate inflation thereof, the sealing ring 10 is positioned immediately adjacent and concentric with the flange 28 of the wheel rim 26, as depicted in FIGURE 3. Thereafter, the sealing ring 10 is displaced laterally across the flange 28 as indicated by the arrows 30 (FIGURE 4) a distance sufficient to urge the projection 20 of the compressible layer 16 into compressive abutment with the sidewall 32 of the tire 24. Due to the stiffness of the tire, the displacement of the sealing ring 10, as immediately above-described, will tend to urge the tire bead 34 into airtight sealing engagement with the bead groove or bead ledge 36 at flange 38 of the wheel rim 26. Furthermore, because the inside diameter of the sealing ring 10 is somewhat less than the diameter of the flange 28, the immediately above-described displacement of the ring 10 as indicated by the arrows 30 will compress the compressible layer 16 along its engagement with the periphery of the flange 28 which engagement is generally designated numeral 40. This position is generally illustrated in FIGURE 4 of the drawings.

With the sealing ring 10 in airtight sealed relation with both the sidewall 32 of the tire 24 and the periphery of the flange 28 of the wheel rim 26, the tire is inflated through valve stem 45 which extends through the rim and thus introduces air to the space radially inside of the sealing ring 10 and the outside of the wheel rim 26 and the space radially inside of the portion of the side wall 32 of the tire contacted by the sealing ring 10 to admit air to the V-shaped cavity 42 within the tire. Introduction of air into the space between the rim and the interior of the tire designated 41 and into the internal U-shaped cavity 42 of the tire 24 will spread the tire sidewalls to incrementally displace the sealing ring 10 back across the flange 28 with only nominal pressure build-up as air is progressively introduced into the cavity 42, without breaking the seal between the ring 10, the sidewall 32 and the flange 28. This displacement of the sealing ring 10 continues as the other tire bead 44 is brought into sealed relation with the bead groove or bead ledge 46 at the flange 28 of the tire rim 26.

Advantageously, it is not necessary to interrupt the inflation of the tire, since the only force to which the sealing ring 10 is subjected is the slight lateral load necessary to displace the ring back across the flange 28 as the bead 44 is brought into engagement with the bead ledge 46.

When the tire 24 has been fully inflated it will have assumed the position depicted in FIGURE 5. Thus, the sealing ring 10 will have been displaced, as illustrated, to a position essentially laterally offset from the wheel flange 28.

As can be readily appreciated from the foregoing, such manipulative use of the sealing ring 10 is (1) completely safe to bystanders and operating personnel, (2) of simple construction without working parts, (3) inexpensive initially and necessitates generally no or very little maintenance, (4) can be used to inflate the tire in a relatively short time by one man and (5) requires no technically trained personnel to handle and manipulate it.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A device to facilitate the mounting of a tubeless tire having a side wall on a drop center rim having radially extended flanges by creating a temporary seal between the side wall of the tire and a radially extended flange of the drop center rim comprising an annular substantially rigid band of greater diameter than the flange of the rim, a relatively thick uninterrupted compressible layer positioned within and secured to the inner surface of the annular band and having an inner diameter substantially less than the flange diameter of the rim, the compressible layer terminating in an annular uninterrupted substantially V-shaped tip extending axially beyond one end of the annular band to engage the side wall of the tire substantially in air-sealing relation therewith, and a wear resistant surface enveloping the external periphery of the compressible layer and at least a portion of the rigid band to protect the compressible layer and the substantially V-shaped tip from abrasive action and to facilitate the formation of a temporary seal between the radially extended flange of the rim and the side wall of the tire as the compressible layer is deformed by movement relative to the flange of the rim as the device is telescopically moved over the flange of the rim to contacting engagement with the side wall of the tire.

2. The invention defined in claim 1 wherein the relatively thick uninterrupted compressible layer has a radial thickness of one to two inches.

3. The invention defined in claim 1 wherein the compressible layer terminates in an annular uninterrupted substantially V-shaped tip extending beyond both ends of the annular band.

References Cited by the Examiner

UNITED STATES PATENTS

| | | | |
|---|---|---|---|
| 2,779,397 | 1/1957 | Kohsiek | 157—1.1 |
| 2,874,759 | 2/1959 | Ranallo | 157—1.1 |
| 2,874,761 | 2/1959 | Varvaro | 157—1.1 |
| 2,954,079 | 9/1960 | Tarner | 157—1.1 |

GRANVILLE Y. CUSTER, JR., *Primary Examiner.*